United States Patent
Lee et al.

(10) Patent No.: US 11,353,740 B2
(45) Date of Patent: Jun. 7, 2022

(54) BACKLIGHT UNIT AND DISPLAY DEVICE USING THE SAME

(71) Applicant: LG Display Co., Ltd., Seoul (KR)

(72) Inventors: Kyuhwan Lee, Paju-si (KR); GwanHoon Park, Paju-si (KR); Suhun Lee, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 17/072,336

(22) Filed: Oct. 16, 2020

(65) Prior Publication Data

US 2021/0149230 A1 May 20, 2021

(30) Foreign Application Priority Data

Nov. 15, 2019 (KR) .......................... 10-2019-0146818

(51) Int. Cl.
*G02F 1/1335* (2006.01)
*G02F 1/13357* (2006.01)

(52) U.S. Cl.
CPC ...... *G02F 1/1336* (2013.01); *G02F 1/133603* (2013.01); *G02F 1/133605* (2013.01); *G02F 1/133614* (2021.01)

(58) Field of Classification Search
CPC ......... G02F 1/133603; G02F 1/133605; G02F 1/133606; G02F 1/133614
USPC .......................................................... 362/84
See application file for complete search history.

(56) References Cited

U.S. PATENT DOCUMENTS

| | | | |
|---|---|---|---|
| 2012/0218752 A1* | 8/2012 | Sumitani | G02F 1/133605 362/235 |
| 2014/0204578 A1* | 7/2014 | Kim | F21V 7/00 362/235 |
| 2015/0021634 A1* | 1/2015 | Ishihara | G02F 1/133512 257/88 |
| 2016/0076737 A1* | 3/2016 | Wang | G02F 1/133606 362/97.1 |
| 2019/0285950 A1* | 9/2019 | Liu | G02F 1/133606 |
| 2019/0324184 A1* | 10/2019 | Cai | G02B 6/0068 |
| 2019/0369442 A1* | 12/2019 | Zhang | G02F 1/133611 |

* cited by examiner

*Primary Examiner* — Christopher M Raabe
(74) *Attorney, Agent, or Firm* — Polsinelli PC

(57) ABSTRACT

A backlight unit comprises a light emitting unit having a plurality of light emitting elements, a light conversion sheet having a plurality of light conversion patterns disposed at positions corresponding to the plurality of light emitting elements, and a phosphor film disposed on the light conversion sheet and including a partition wall dividing a light emitting surface into a plurality of sub-blocks and phosphor layers respectively disposed on the plurality of sub-blocks.

16 Claims, 23 Drawing Sheets

BACKLIGHT UNIT AND DISPLAY DEVICE USING THE SAME

CROSS-REFERENCE TO RELATED APPLICATION

This application claims priority from Korean Patent Application No. 10-2019-0146818, filed on Nov. 15, 2019, which is hereby incorporated by reference in its entirety.

BACKGROUND

Field of the Disclosure

Aspects of the present disclosure relate to a backlight unit and a display device including the backlight unit.

Description of the Background

As the information society develops, the demand for display devices for displaying images is increasing in various forms. Various types of display devices such as a liquid crystal display device (LCD), an organic light emitting display device (OLED), and a quantum dot light emitting display device (QLED) have been used for this purpose.

Among flat panel display devices, the liquid crystal display device may utilize a light emitting diode (LED), a cold cathode fluorescent lamp (CCFL), and a hot cathode fluorescent lamp (HCLF) as a light source of a backlight unit. Recently, the light emitting diodes having excellent light efficiency and high color reproducibility are widely used as light sources of the backlight units.

The backlight unit may be classified into an edge-type or a direct-type according to the arrangement of the light source and the transmission mode of light. In the direct-type backlight unit, the light source such as the LED may be disposed on the rear surface of the display device.

SUMMARY

Accordingly, the present disclosure is to provide the backlight unit capable of improving image quality and a display device including such a backlight unit.

In accordance with an aspect of the present disclosure, there may be provided with a backlight unit comprising: a light emitting unit having a plurality of light emitting elements; a light conversion sheet having a plurality of light conversion patterns disposed at positions corresponding to the plurality of light emitting elements; and a phosphor film disposed on the light conversion sheet and including a partition wall dividing a light emitting surface into a plurality of sub-blocks and phosphor layers respectively disposed on the plurality of sub-blocks.

In accordance with another aspect of the present disclosure, there may be provided with a display device comprising: a display panel; and a backlight unit disposed under the display panel and emitting light to the display panel, wherein the backlight unit includes a light emitting unit having a plurality of light emitting elements, a light conversion sheet having a plurality of light conversion patterns disposed at positions corresponding to the plurality of light emitting elements, and a phosphor film disposed on the light conversion sheet and including a partition wall dividing a light emitting surface into a plurality of sub-blocks and phosphor layers respectively disposed on the plurality of sub-blocks.

According to aspects of the present disclosure, it is possible to provide with the backlight unit capable of improving image quality and the display device including the backlight unit.

BRIEF DESCRIPTION OF THE DRAWINGS

The accompanying drawings, which are included to provide a further understanding of the disclosure and are incorporated in and constitute a part of the present disclosure, illustrate aspect(s) of the disclosure and together with the description serve to explain the principle of the disclosure.

In the drawings.

DETAILED DESCRIPTION

Figure 1:
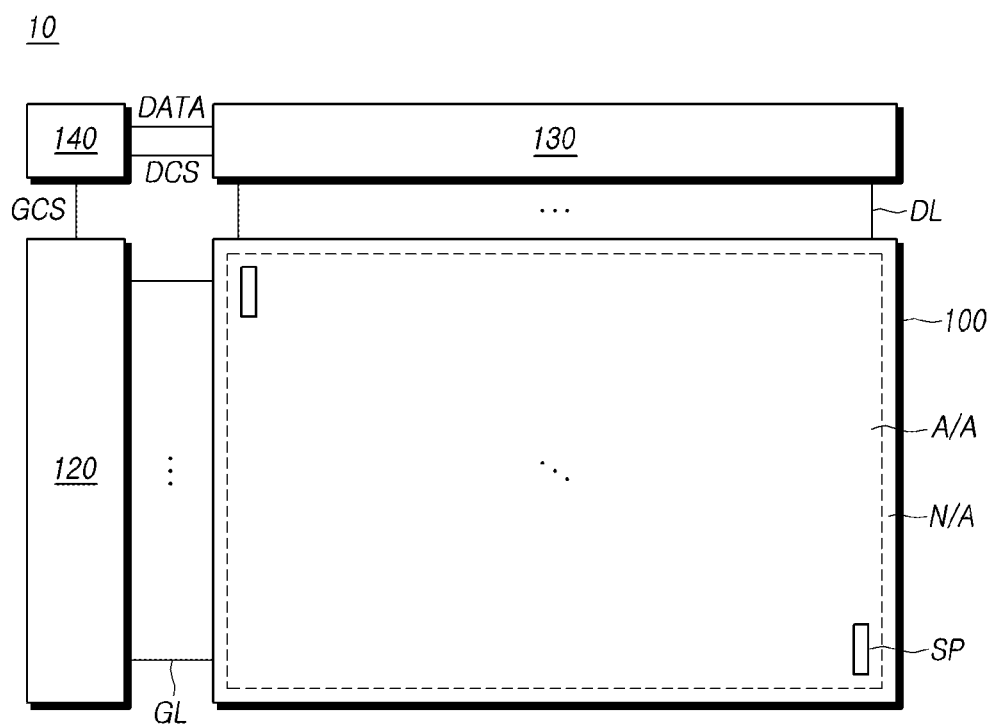
FIG. 1 is a structural diagram illustrating the display device according to aspects of the present disclosure.

In the following description of examples or aspects of the present disclosure, reference will be made to the accompanying drawings in which it is shown by way of illustration specific examples or aspects that can be implemented, and in which the same reference numerals and signs can be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as "including", "having", "containing", "constituting", and "comprising" used herein are generally intended to allow other components to be added unless the terms are used with the term "only". As used herein, singular forms are intended to include plural forms unless the context clearly indicates otherwise.

Terms, such as "first", "second", "A", "B", "(a)", or "(b)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "overlaps" etc. a second element, it should be interpreted that, not only can the first element "be directly connected or coupled to" or "directly overlap" the second element, but a third element can also be "interposed" between the first and second elements, or the first and second elements can "be connected or coupled to", "overlap", etc. each other via a fourth element. Here, the second element may be included in at least one of two or more elements that "are connected or coupled to", "overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified.

FIG. 1 is a diagram illustrating a schematic configuration of a display device according to aspects of the present disclosure.

Referring to FIG. 1, the display device 10 according to aspects of the present disclosure may include the display panel 100 including the active area A/A and a non-active area N/A, the gate driving circuit 120 and the data driving circuit 130 for driving the display panel 100, the controller 140 and the like.

In the display panel 100, a plurality of gate lines GL and a plurality of data lines DL may be disposed, and a subpixel SP may be located in an area where the gate lines GL and the data lines DL intersect. Also, the display panel 100 may be a liquid crystal panel. The liquid crystal panel may include a pixel electrode, a common electrode, and a liquid crystal layer disposed between the pixel electrode and the common electrode. The liquid crystal layer may display the image by blocking or transmitting light by changing the molecular arrangement in response to the voltage applied to the pixel electrode and the common electrode.

The gate driving circuit 120 may be controlled by the controller 140, and may sequentially output the scan signal to the plurality of gate lines GL arranged on the display panel 100, thereby can control the driving timing of the multiple subpixels SP. The gate driving circuit 120 may include one or more gate driver integrated circuits (GDIC), and may be located on one side of the display panel 100 or on both sides according to a driving method.

Each gate driver integrated circuit (GDIC) may be connected to a bonding pad of the display panel 100 by a tape-automated bonding (TAB) method or a chip-on-glass (COG) method, or may be implemented as a gate-in-panel (GIP) type and directly disposed on the display panel 100. Alternatively, each gate driver integrated circuit (GDIC) may be integrated and disposed in the display panel 100. Further, each gate driver integrated circuit (GDIC) may be implemented in a chip on film (COF) method mounted on a film connected to the display panel 100.

The data driving circuit 130 may receive image data from the controller 140 and convert the image data to an analog data voltage. The data driving circuit 130 may output the data voltage to each data line DL according to the timing at which the scan signal is applied through the gate line GL, so that each subpixel SP can express brightness according to image data. The data driving circuit 130 may include one or more source driver integrated circuits (SDICs). Each source driver integrated circuit (SDIC) may include a shift register, a latch circuit, a digital-to-analog converter, and an output buffer, however, is not limited thereto.

Each source driver integrated circuit (SDIC) may be connected to the bonding pad of the display panel 100 by the tape automated bonding (TAB) method or the chip-on-glass (COG) method, or directly disposed on the display panel 100, or, in some cases, may be integrated and directly disposed in the display panel 100. In addition, each source driver integrated circuit (SDIC) may be implemented in a chip-on-film (COF) method in which each source driver integrated circuit (SDIC) is mounted on a film connected to the display panel 100 and electrically connected to the display panel 100 through lines on the film.

The controller 140 may supply various control signals to the gate driving circuit 120 and the data driving circuit 130, and can control the operation of the gate driving circuit 120 and the data driving circuit 130. The controller 140 may be mounted on a printed circuit board, a flexible printed circuit, or the like, and may be electrically connected to the gate driving circuit 120 and the data driving circuit 130 through a printed circuit board, a flexible printed circuit, or the like.

The controller 140 may control the gate driving circuit 120 to output the scan signal according to the timing implemented in each frame, and may output the converted image data by converting the externally received image data according to the data signal format used by the data driving circuit 130 to the data driving circuit 130. The controller 140 may receive various timing signals including vertical synchronizing signal VSYNC, horizontal synchronizing signal HSYNC, input data enable signal DE, clock signal CLK, and the like along with image data from the outside (e.g., a host system).

The controller 140 may generate various control signals using various timing signals received from the outside and output the control signals to the gate driving circuit 120 and the data driving circuit 130. For example, in order to control the gate driving circuit 120, the controller 140 may output various gate control signals GCS including a gate start pulse GSP, a gate shift clock GSC, and a gate output enable signal GOE etc. Here, the gate start pulse GSP may control the operation start timing of one or more gate driver integrated circuits GDIC constituting the gate driving circuit 120.

The gate shift clock GSC is a clock signal commonly input to one or more gate driver integrated circuits GDIC, and can control the shift timing of the scan signal. The gate output enable signal GOE may specify timing information of one or more gate driver integrated circuits GDIC.

In addition, in order to control the data driving circuit 130, the controller 140 may output various data control signals DCS including a source start pulse SSP, a source sampling clock SSC, and a source output enable SOE etc. Here, the source start pulse SSP may control the data sampling start timing of one or more source driver integrated circuits SDICs constituting the data driving circuit 130. The source sampling clock SSC may be a clock signal that controls sampling timing of data in each of the source driver integrated circuits SDIC. The source output enable signal SOE may control the output timing of the data driving circuit 130.

The display device 10 may further include a power management integrated circuit which supplies various voltages or currents to the display panel 100, the gate driving circuit 120, and the data driving circuit 130, or controls various voltages or currents to be supplied.

Figure 2:
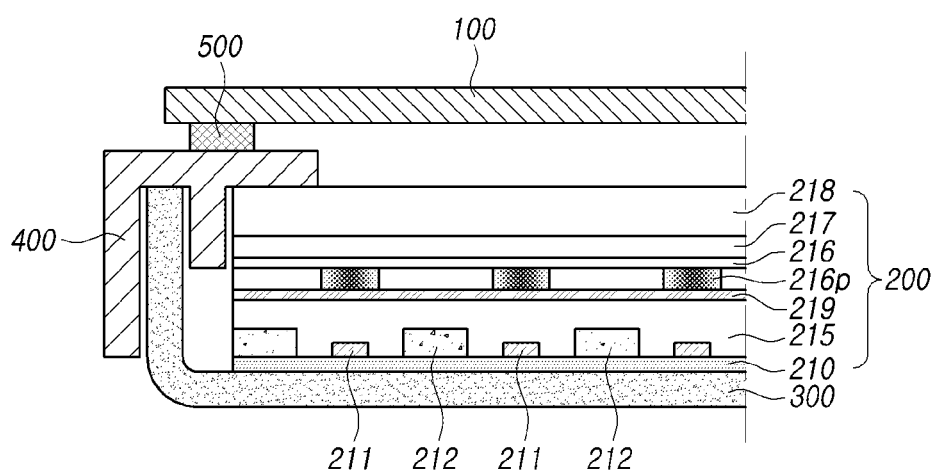
FIG. 2 is a cross-sectional view illustrating the display device according to some example aspects of the present disclosure.

FIG. 2 is a cross-sectional view illustrating the display device according to some example aspects of the present disclosure.

Referring to FIG. 2, the display device 10 according to aspects of the present disclosure may include the display panel 100 and the backlight unit 200 disposed below the display panel 100 and supplying light to the display panel 100.

A plurality of structures may be disposed between the backlight unit 200 and the display panel 100. For example, the guide panel 400 and the foam pad 500 may be disposed between the backlight unit 200 and the display panel 100, but are not limited thereto.

The backlight unit 200 may include a cover bottom 300 that accommodates optical elements or the like constituting the backlight unit 200.

The substrate 210 may be disposed on the cover bottom 300, and a plurality of light emitting elements 211 may be disposed on the substrate 210. The light emitting elements 211 may be, for example, a light emitting diode (LED), or may be a small mini light emitting diode (Mini LED) or a small micro light emitting diode (μLED). In addition, the light emitting elements 211 may have a flip chip structure. The light emitting elements 211 of the flip chip structure may be disposed in a form in which the chip type light emitting element 211 is mounted on the substrate 210, thereby reducing the thickness of the backlight unit 200 and providing a light source having a wide emission angle and a high light efficiency.

The light emitting element 211 may emit light in a white wavelength band, or in some cases, emit light in a specific wavelength band (eg, blue wavelength band). The substrate 210 may be a printed circuit board.

In addition, the light source protection layer 215 may be disposed on the substrate 210 on which the plurality of light emitting elements 211 are disposed. The light source protection layer 215 may include transparent resin. The light source protection layer 215 may protect a plurality of light emitting elements 211 and may provide a function of diffusing light emitted from the light emitting elements 211.

The light conversion sheet 216 may be disposed on the light source protection layer 215. The light conversion sheet 216 may scatter, reflect, or diffract light emitted from the light emitting element 211. In addition, the light conversion sheet 216 may transmit a portion of light emitted from the light emitting element 211. The light conversion sheet 216 may be a light control sheet capable of transmitting a portion of light. The light conversion sheet 216 may prevent hot spots from being generated in the backlight unit 200. The light conversion sheet 216 includes a plurality of light conversion patterns 216p, and the plurality of light conversion patterns 216p may be disposed to overlap each of the plurality of light emitting elements 211.

The light conversion pattern 216p may adjust an emission direction of light emitted from the light emitting element 211, for example, may scatter, reflect, or diffract a part of light emitted from the light emitting element 211. Also, the light conversion pattern 216p may transmit a part of light emitted from the light emitting element 211. The light conversion pattern 216p may be a light control pattern capable of transmitting a portion of light. The light emitted from the light emitting element 211 is scattered, reflected, diffracted, or transmitted by the light conversion pattern 216p, so that the light conversion sheet 216 can make the brightness of the backlight unit 200 uniform.

Since the light conversion pattern 216p is disposed to overlap with the light emitting element 211, the light conversion pattern 216p may be disposed in a region where the intensity of light emitted from the light emitting element 211 is strongest. For this reason, it is possible to reduce the luminance deviation between the region where the light emitting element 211 is disposed (a region having a large amount of light) and the region between the light emitting elements 211 (a region having a small amount of light).

The light conversion sheet 216 may include an optical conversion material. In addition, the light conversion pattern 216p of the light conversion sheet 216 may include the optical conversion material. The optical conversion material may include titanium dioxide (TiO2). In addition, the optical conversion material may be white, however, is not limited thereto.

In addition, the luminance variation may be reduced by the light conversion sheet 216, so that, in the backlight unit 200, it is possible to suppress the occurrence of mura, which is not uniform in the characteristics of the screen and is stained in the peripheral area of the light emitting element 211. Accordingly, the luminance of light emitted from the backlight unit 200 may be uniform.

The phosphor film 217 may be disposed on the light conversion sheet 216. The phosphor film 217 may include a phosphor, and the phosphor may emit light by the light irradiated onto the phosphor film 217. If light incident on the phosphor film 217 is blue light, the light transmitting through the phosphor film 217 may be converted into white light by the light emitted from the phosphor.

The light conversion pattern 216p is illustrated as being disposed adjacent to the light source protection layer 215, but is not limited thereto, and the light conversion pattern 216p may be disposed adjacent to the phosphor film 217.

In addition, a reflective film may be coated on the substrate 210. The reflective film may include a white pigment, however, is not limited thereto. The reflective film may reflect light irradiated onto the substrate 210 to increase the light efficiency of the backlight unit 200. Also, the reflector 212 may be disposed on the substrate 210 and may be disposed around the light emitting element 211.

The reflector 212 may reflect the light diffused from the light source protection layer 215 so as to be irradiated in the direction of the phosphor film 217, thereby making the luminance of the backlight unit 200 uniform. In addition, an adhesive film 219 may be disposed between the light source protection layer 215 and the light conversion sheet 216. The adhesive film 219 may be an optical clear adhesive (OCA) film. The adhesive film 219 may allow the light conversion sheet 216 to be fixed on the light source protection layer 215.

Figure 3:
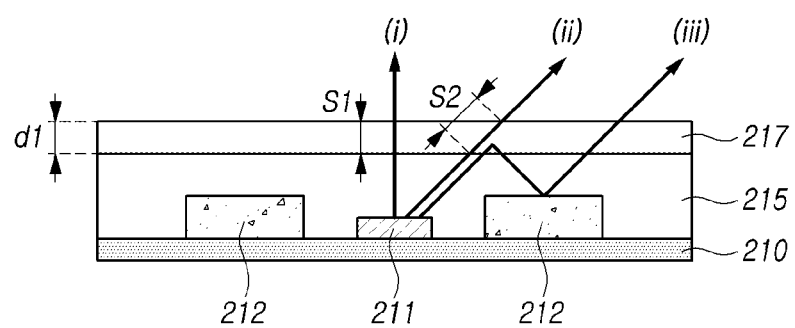
FIG. 3 is a diagram illustrating the color of light transmitted through the phosphor film.
Figure 4A:
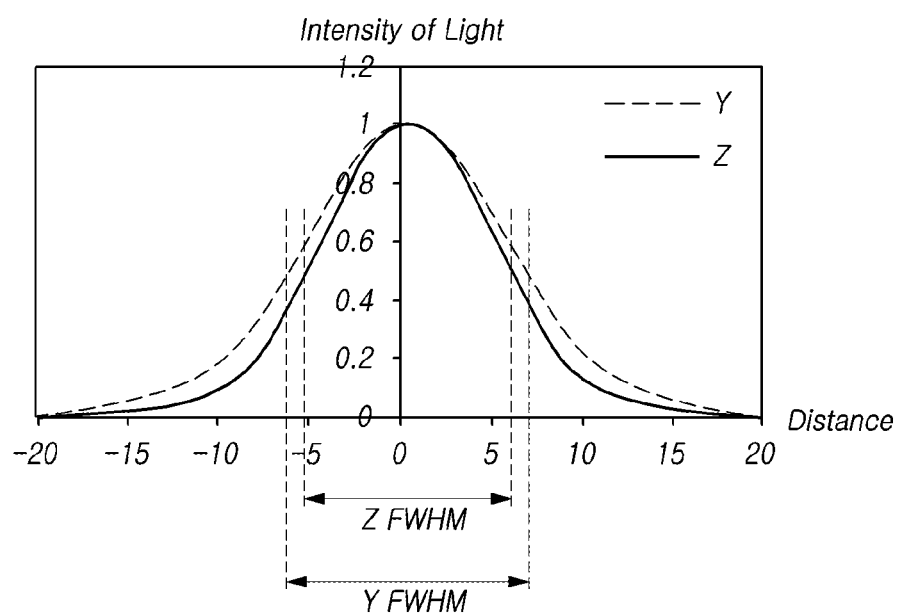
FIGS. 4A and 4B are graphs illustrating the color coordinates.
Figure 4B:
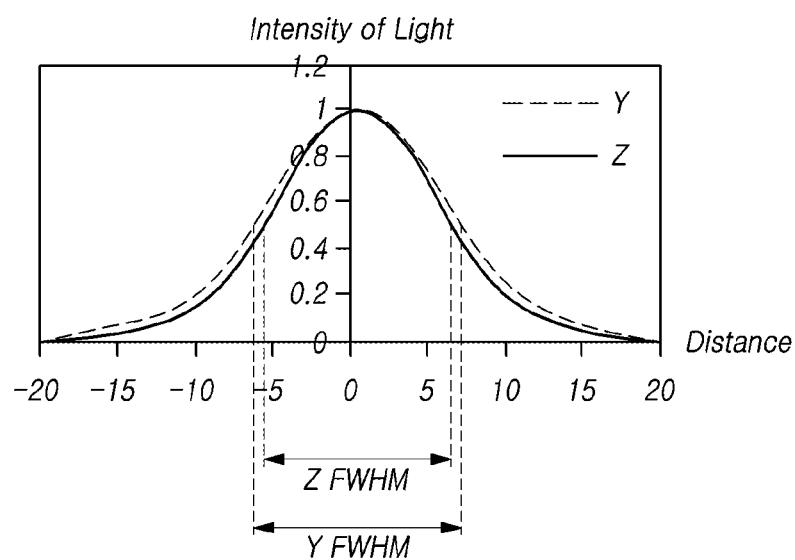

FIG. 3 is a diagram illustrating the color of light transmitted through the phosphor film, and FIGS. 4A and 4B are a graph illustrating the color coordinates.

In FIG. 3, for convenience of description, the phosphor film 217 is illustrated to be directly disposed on the light source protection layer 215, but is not limited thereto.

FIG. 3 explains the feature that when the blue light is incident on the phosphor film 217 and white light is emitted, the yellow light is increased in the backlight unit 200 as the distance from the light emitting element 211 increases. The light emitting element 211 may emit blue light having an irradiation angle close to 180 degrees. Among the blue light emitted from the light emitting element 211, the first light (i) having a path perpendicularly incident on the phosphor film 217 may be emitted as white light by the phosphor film 217 when passing through the phosphor film 217.

However, the second light (ii) having a path obliquely passing through the phosphor film 217 among the blue light emitted from the light emitting element 211 may have a longer distance passing through the phosphor film 217 than the first light (i). More specifically, the light vertically incident on the phosphor film 217 such as the first light (i) among the light emitted from the light emitting element 211 may pass the distance S1 corresponding to the thickness d1 of the phosphor film 217 within the phosphor film 217. Meanwhile, the second light (ii) obliquely incident on the phosphor film 217 may pass the long distance S2 greater than the thickness d1 of the phosphor film 217 in the phosphor film 217.

The phosphor film 217 may add yellow light excited by the phosphor to blue light emitted from the light emitting element 211 to become white light. Therefore, the longer the path of blue light passing through the phosphor film 217 is, the more light emitted from the phosphor film 217 may be, so that the amount of yellow light added to the blue light may be increased.

Therefore, as the distance from the light emitting element 211 increases by the irradiation angle, the light passing through the phosphor film 217 may further include yellow light. In particular, the third light (iii) having a path reflected by the reflector 212 after being emitted from the phosphor film 217 and incident on the light source protection layer 215 is re-incident to the phosphor film 217. Therefore, in the case of the third light (iii), yellow light may be further added again from the phosphor film 217, and the amount of yellow light may be further increased.

Since the light reflected by the reflector 212 may incident to the phosphor film 217 at an angle, it may reach a distant place from the light emitting element 211, and the backlight unit 200 may increase yellow light as the distance from the light emitting element 211 increases.

In FIGS. 4A and 4B, the horizontal axis represents the distance from the light emitting element 211. On the horizontal axis, (+) represents the right direction of the light emitting element and (−) represents the left direction of the light emitting element. In addition, the vertical axis represents light intensity as a ratio. That is, 1 on the vertical axis represents a state where the intensity of light is maximum. In addition, Y represents the intensity of yellow light and Z represents the intensity of blue light.

As shown in the graph of FIG. 4A, when the length of the full width half maximum (FWHM) of Y is longer than the length of the FWHM of Z, the yellow light becomes stronger as the distance from the light emitting element 211 increases. When the length of the FWHM of Y is not within a range of 110% of the length of the FWHM of Z, a problem that yellow light appears as the distance from the light emitting element in the backlight unit 200 increases may occur.

Accordingly, as shown in the graph of FIG. 4B, it is possible to make the length of the FWHM of Y within 110% of the length of the FWHM of Z by making the length of the FWHM of Y shorter than that of the graph of FIG. 4A.

Figure 5:
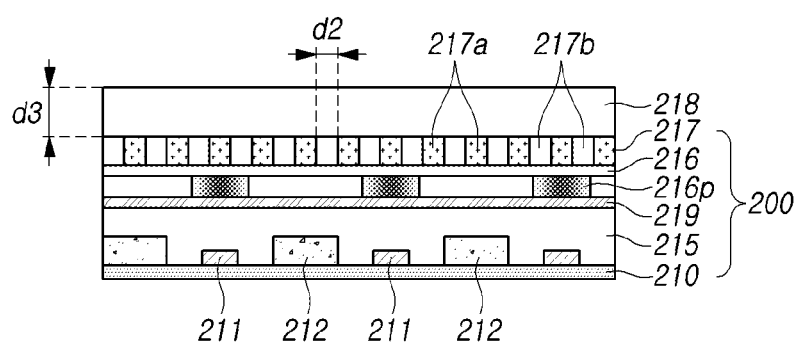
FIG. 5 is a cross-sectional view illustrating the backlight unit according to aspects of the present disclosure.

FIG. 5 is a cross-sectional view illustrating the backlight unit according to aspects of the present disclosure.

Referring to FIG. 5, in the backlight unit 200 according to the present aspect, the light emitting element 211 and the reflector 212 may be disposed on the substrate 210. In addition, the light source protection layer 215 may be disposed on the substrate 210 and the reflector 212. The light conversion sheet 216 may be disposed on the light source protection layer 215 and the optical sheet 218 may be disposed on the light conversion sheet 216. The optical sheet 218 may include a plurality of sheets. The optical sheet 218 may include a diffuser plate, a diffusion sheet, and a prism sheet. However, the optical sheet 218 is not limited thereto. In addition, the diffuser plate may be disposed on the lower surface of the phosphor film 217. In addition, the light conversion sheet 216 may include the light conversion pattern 216p. The light conversion pattern 216p may be disposed at a position overlapping the light emitting element 211.

The phosphor film 217 may include a plurality of partition walls 217b and a phosphor layer 217a disposed in each of the spaces formed between the partition walls 217b. In particular, the partition wall 217b should not be recognized by being covered by the optical sheet 218. At this time, when the thickness of the partition wall 217b is thicker than the thickness of the optical sheet 218, a problem may occur in which the partition wall 217b is recognized by the user. Accordingly, the thickness of the partition wall 217b constituting the phosphor film 217 should be equal to or smaller than the thickness of the optical sheet 218.

The thickness of the partition wall 217b may not be constant, and the maximum thickness d2 of the partition wall 217b may be at most the thickness d3 of the optical sheet 218. The optical sheet 218 may include a plurality of sheets, and the maximum thickness of the partition wall 217b may be the sum of the thicknesses of the plurality of sheets included in the optical sheet 218. Further, the partition wall 217b may include resin. Further, the color of the partition wall 217b may be white. However, the material and color of the partition wall 217b may be not limited thereto.

Figure 6A:
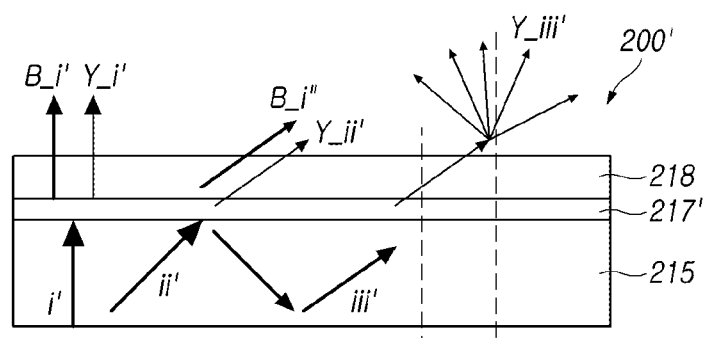
FIGS. 6A and 6B are comparative diagrams illustrating a light emitted from the backlight unit according to aspects of the present disclosure and a backlight unit including a general phosphor film.
Figure 6B:
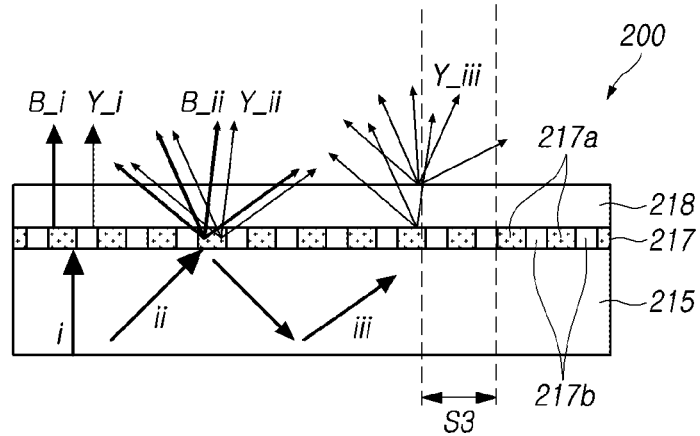

FIGS. 6A and 6B are a comparative diagram illustrating a light emitted from the backlight unit according to aspects of the present disclosure and a backlight unit including a general phosphor film.

FIG. 6A represents a backlight unit 200' in which a general phosphor film 217' is used, and FIG. 6B represents a backlight unit 200 in which the phosphor film 217 according to the present disclosure as shown in FIG. 5 is employed. In FIG. 6A, the phosphor film 217' has a phosphor disposed uniformly, but in FIG. 6B, the phosphor film 217 includes the partition wall 217b and the phosphor 217a may be disposed only in the space formed by the partition wall 217b.

As shown in FIG. 6A, among the light emitted from the light emitting element 211, the first light (i') having a path incident perpendicular to the phosphor film 217' may be incident vertically to the phosphor film 217'. Yellow light may be added to the first light (i') by the phosphor film 217'. That is, the first light (i') which is incident on the phosphor film 217' vertically and shows blue may be emitted as white light after passing through the phosphor film 217' by the first blue light (B_i') passing through the phosphor film 217' and the first yellow light (Y_i') emitted from the phosphor film 217' while passing through the phosphor film 217'.

In addition, among the light emitted from the light emitting element 211, the second light (ii') having a path incident obliquely to the phosphor film 217' may represent blue and may pass through the phosphor film 217' at an angle. The second light (ii') may be emitted as white light after passing through the phosphor film 217' by the second blue light (B ii') obliquely passing through the phosphor film 217' and the second yellow light (Y_ii') emitted from the phosphor film 217' while obliquely passing through the phosphor film 217'. The second light (ii') is emitted as white light by the second blue light (B ii') and the second yellow light (Y_ii'), but since the since second light (ii') passes through the phosphor film 217' at an angle, it may contain more yellow light emitted from the phosphor film 217' more than the light emitted vertically. And, among the light emitted from the light emitting element 211, the third light (iii') which is reflected on phosphor film 217', then reflected back by the reflector 212 and then is incident on the phosphor film 217' may reach a distance from the light emitting element 211 farther than the first light (i') and the second light (ii'). In the case of the third light (iii'), the amount of blue light is reduced when reflected from the phosphor film 217', but the amount of yellow light can be increased. The third light (iii') may be the third yellow light (Y_iii') after passing through the phosphor film 217'. Therefore, in the backlight unit 200', yellow may appear more strongly at a portion away from the position of the light emitting element 211.

However, as shown in FIG. 6B, the first light (i) having a path incident perpendicular to the phosphor film 217 may be converted from the blue light to the white light by the first blue light (B i) passing through the phosphor film 217 and the first yellow light (Y i) emitted from the phosphor film 217 while passing through the phosphor film 217. The second light (ii) having a path incident obliquely to the phosphor film 217 may include the second blue light (B ii) and the second yellow light (Y_ii) emitted from the phosphor film 217 while obliquely passing through the phosphor film 217. The second blue light (B ii) and the second yellow light (Y_ii) may be scattered while striking the partition wall 217b included in the phosphor film 217.

In addition, the third yellow light (Y_iii) by the third light (iii) which is reflected on the phosphor film 217, then reflected back by the reflector 212 and then is incident on the phosphor film 217 may also scatter by striking the partition wall 217b. As shown in FIG. 6B, since the position where the third yellow light (Y_iii') is scattered is closer to the light emitting element 211 by the distance S3 as compared with FIG. 6A, a region having a strong yellow light intensity may be closer to the light emitting element 211.

Accordingly, in the case of FIG. 6B, the intensity of the yellow light can be made stronger in the vicinity of the light emitting element. Therefore, as shown in FIG. 4B, the difference between the length of the FWHM of Y and the length of the FWHM of Z is not large, so that the length of the FWHM of Y can be within 110% of the length of the FWHM of Z. Accordingly, the portion where the yellow color appears in the backlight unit 200 can be reduced, so that the color uniformity of the backlight unit 200 can be increased. As a result, the image quality of the display device 10 including the backlight unit 200 may be improved.

Figure 7:
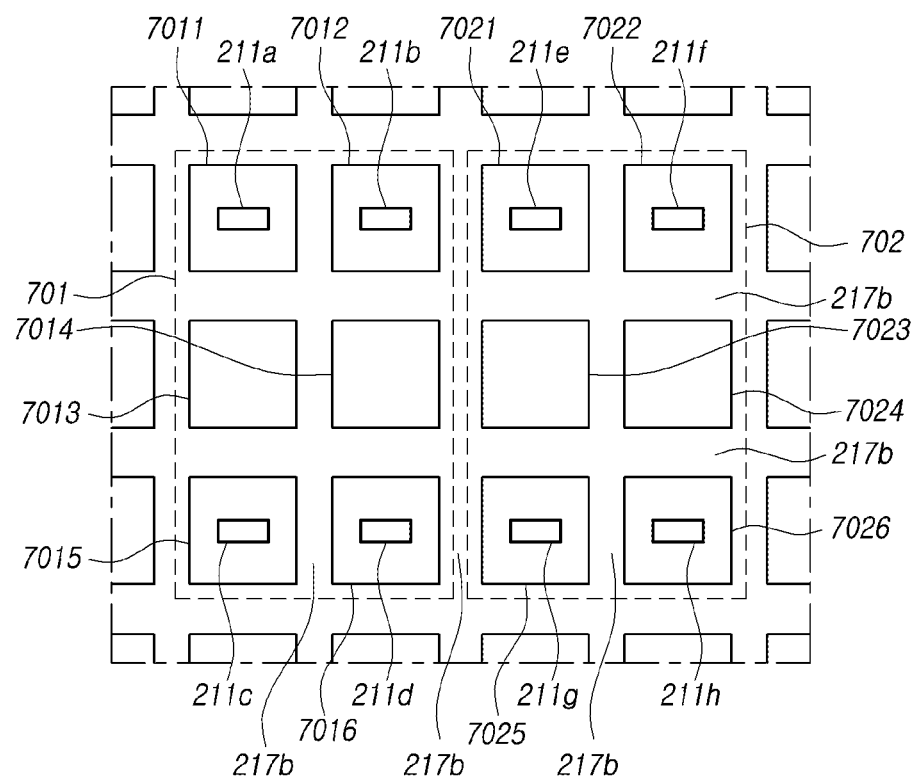
FIG. 7 is a plan view illustrating a portion of the phosphor film according to aspects of the present disclosure.
Figure 9:
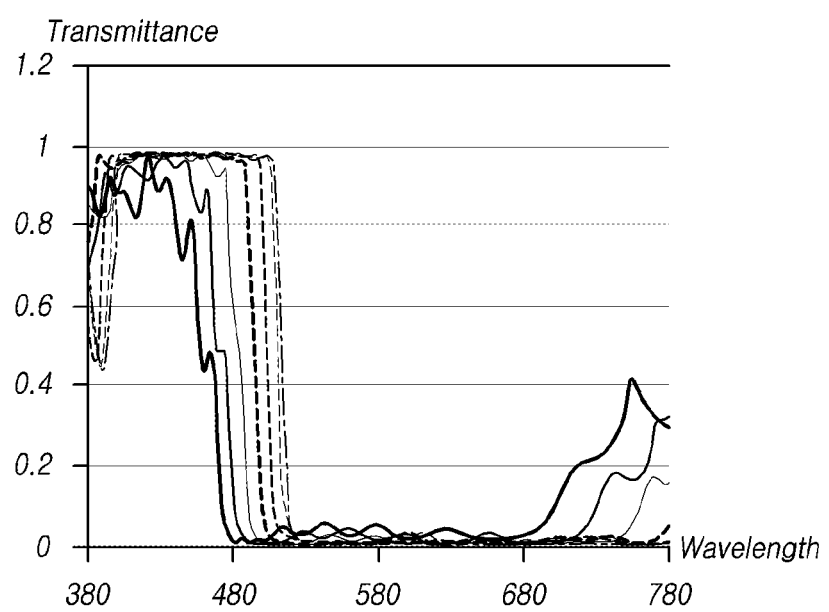
FIG. 9 is a graph illustrating transmittance of the optical filter according to aspects of the present disclosure.
Figure 10:
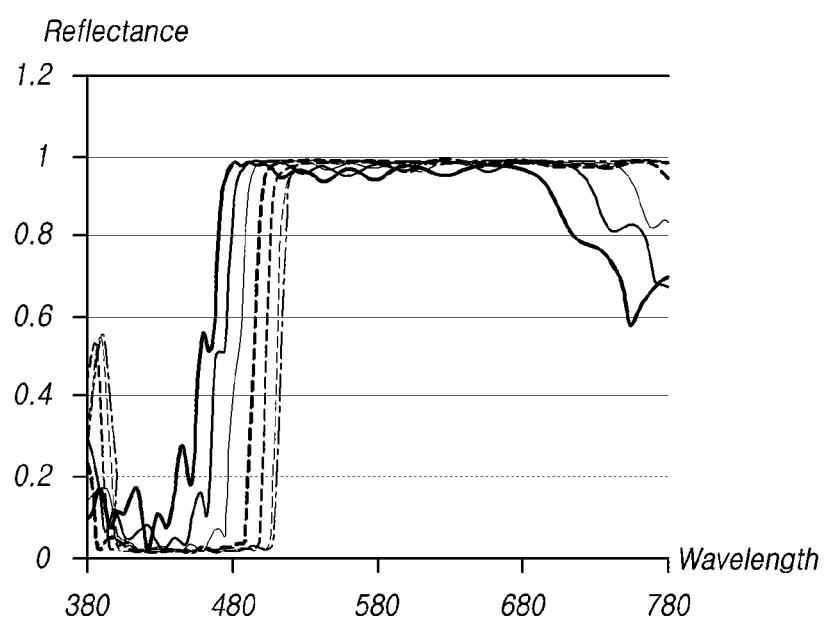
FIG. 10 is a graph illustrating reflectance of an optical filter according to aspects of the present disclosure.

FIG. 7 is a plan view illustrating a portion of the phosphor film according to aspects of the present disclosure, and FIGS. 8A to 8D are a cross-sectional view illustrating the phosphor film according to aspects of the present disclosure. In addition, FIG. 9 is a graph illustrating transmittance of the optical filter according to aspects of the present disclosure, and FIG. 10 is a graph illustrating reflectance of an optical filter according to aspects of the present disclosure.

Referring to FIG. 7, the phosphor film 217 may include a first light emitting block 701 and a second light emitting block 702. The first light emitting block 701 and the second light emitting block 702 may include six sub-blocks 7011 to 7016 and 7021 to 7026, respectively. Each of the sub-blocks 7011 to 7016, 7021 to 7026 may be divided by the partition wall 217b. That is, the partition wall 217b may divide the light emitting surface of the phosphor film 217 into a plurality of sub-blocks 7011 to 7016 and 7021 to 7026. In addition, the phosphor film 217 may include phosphors 217a disposed in respective sub-blocks 7011 to 7016 and 7021 to 7026, respectively. The partition wall 217b may include a white resin. In addition, the partition wall 217b may include a transparent resin. Here, the number of sub-blocks 7011 to 7016 and 7021 to 7026 included in the first light emitting block 701 and the second light-emitting block 702 is illustrated as six, but is not limited thereto.

In addition, one of the light emitting elements 211a to 211d may be disposed in four sub-blocks 7011, 7012, 7015, 7016 among the six sub-blocks 7011 to 7016 of the first light emitting block 701, respectively, but no light emitting elements may be arranged in the two sub-blocks 7013 and 7014. One of light emitting element 211e to 211h may be disposed in four sub-blocks 7021, 7022, 7025, 7026 among six sub-blocks 7021 to 7026 of the second light emitting block 702, respectively, and no light emitting elements may be arranged in two sub-blocks 7023 and 7024. The first light emitting block 701 and the second light emitting block 702 may be driven independently. That is, the luminance of the light emitting elements 211a to 211d included in the first light emitting block 701 can be controlled to be driven identically, and the luminance of the light emitting elements 211e to 211h included in the second light emitting block 702 can be controlled to be driven identically.

Here, although the first light emitting block 701 and the second light emitting block 702 are illustrated as including two sub-blocks in which light emitting elements are not disposed, the present disclosure is not limited thereto. Sub-blocks in which light emitting elements are not disposed may not be included in the first light emitting block 701 and the second light emitting block 702. Accordingly, the number of sub-blocks divided by the partition wall may be at least equal to the number of light emitting elements 211.

Figure 8A:
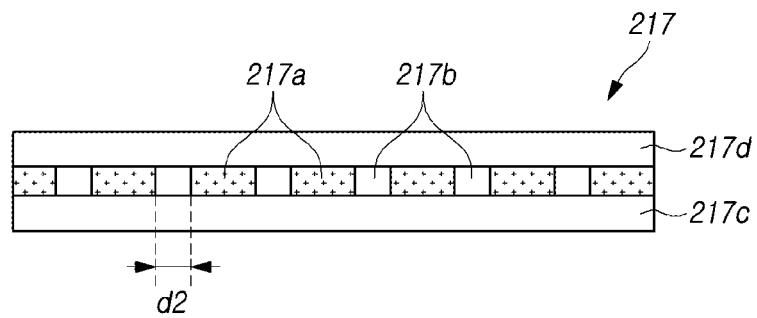
FIGS. 8A to 8D are a cross-sectional view illustrating the phosphor film according to aspects of the present disclosure.
Figure 8B:
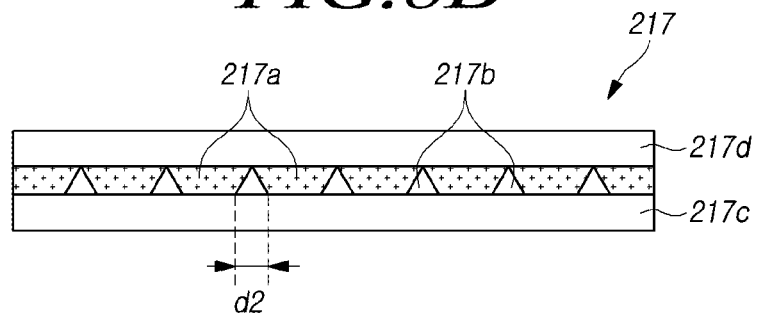
Figure 8C:
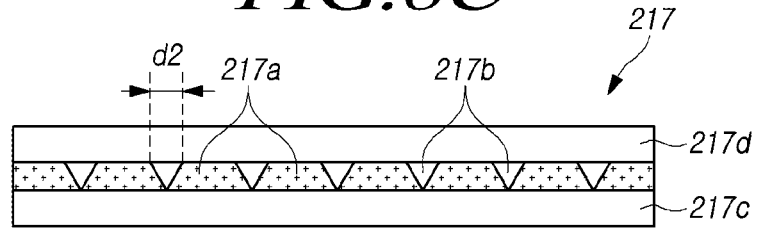

Referring to FIGS. 8A to 8D, the phosphor film 217 may include the first transparent film 217c and the second transparent film 217d disposed on lower and upper portions of the partition wall 217b, respectively. As shown in FIG. 8A, the partition wall 217b may be parallel to the vertical line, and as shown in FIG. 8B and FIG. 8C, the partition wall 217b may be inclined at a specific angle with respect to the vertical line. Accordingly, the partition wall 217b may have a tapered shape. When the partition wall 217b has the tapered shape, the maximum value of the thickness d2 of the portion having the thickest partition wall 217b may be the thickness of the optical sheet 218 disposed thereon.

Figure 8D:
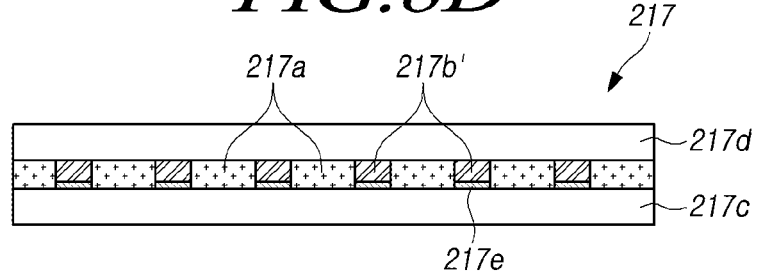

In addition, as shown in FIG. 8D, the partition wall 217b' may include the transparent resin, and the phosphor film 217 may include an optical filter 217e disposed between the first transparent film 217c and the partition wall 217b'. The optical filter 217e may transmit light of a specific wavelength or reflect light of a specific wavelength. In addition, when the light of a specific wavelength is reflected by the optical filter 217e, light of other wavelengths may pass through the optical filter 217e.

The light having a specific wavelength transmitted through the optical filter 217e may be irradiated to the upper portion of the phosphor film 217 through the partition wall 217b' without passing through the phosphor 217a. Light of a specific wavelength reflected by the optical filter 217e may not pass through the optical filter 217e and may be reflected in the direction of the light emitting element 211. Here, the optical filter 217e is illustrated as being disposed between the first transparent film 217c and the partition wall 217b', but is not limited thereto, and may be disposed between the second transparent film 217d and the partition wall 217b'.

Referring to FIG. 9, it is illustrated that light having the wavelength range of 380 to 480 nm has the transmittance of 1, and light having the different wavelength range has the transmittance of less than 1. Also, as FIG. 10, it is illustrated that light having the wavelength range of 490 nm or higher has the reflectance of 1, and light having the wavelength range smaller than that has the reflectance close to zero. That is, the optical filter 217e can transmit light having the wavelength range of 380 to 480 nm as illustrated in FIG. 9 or can reflect light having the wavelength range of 490 nm or higher as illustrated in FIG. 10. That is, the optical filter 217e may transmit blue light or reflect non-blue light.

Figure 11:
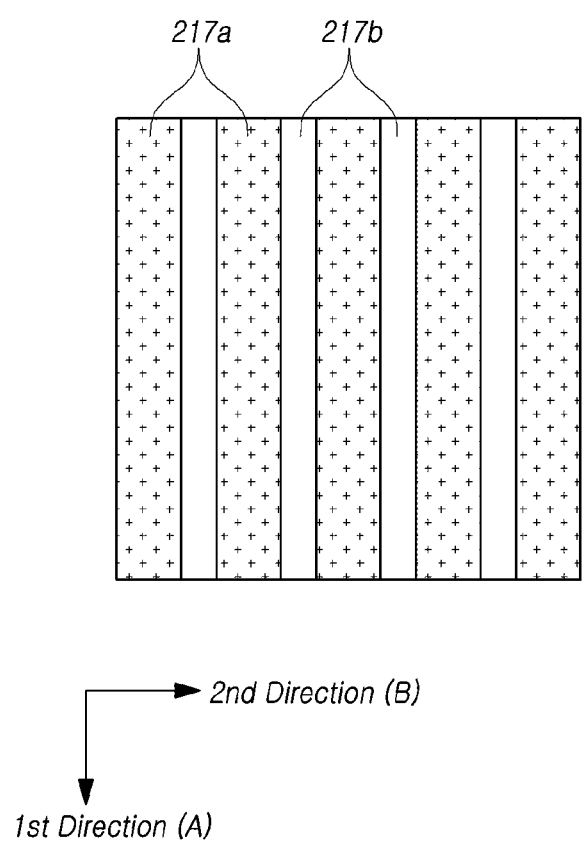
FIG. 11 is a plan view showing an aspect of a phosphor film according to the present disclosure.

FIG. 11 is a plan view showing an aspect of a phosphor film according to the present disclosure.

Referring to FIG. 11, the phosphor film 217 may be extended in the first direction A by the partition wall 217b. When the film for controlling the viewing angle from side to side is attached to the display panel 100, the phosphor film 217 having the partition wall extending in the first direction A may be used. However, the present disclosure is not limited thereto, and the partition wall 217b may extend in the second direction B.

Figure 12A:
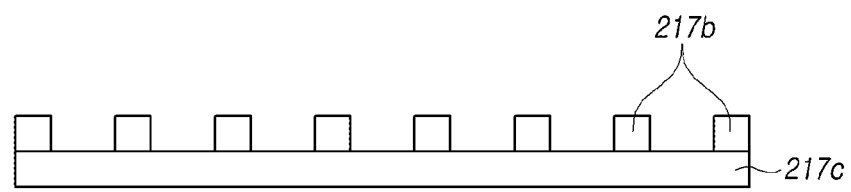
FIGS. 12A to 12C are a diagram illustrating a process of forming the phosphor film according to aspects of the present disclosure.
Figure 12B:
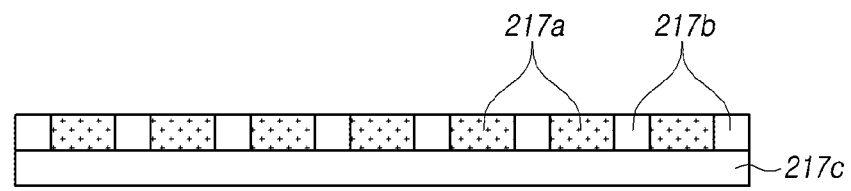
Figure 12C:
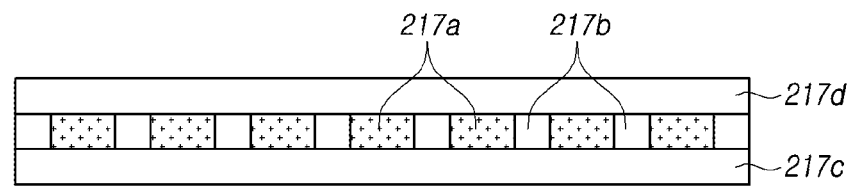

FIGS. 12A to 12C are a diagram illustrating a process of forming the phosphor film according to aspects of the present disclosure.

Referring to FIG. 12A to 12C, as shown in FIG. 12A, the resin may be applied and cured on the first transparent film 217c to form the partition wall 217b. Then, as shown in FIG. 12B, the phosphor 217a may be disposed in the space formed by the partition wall 217b. Then, as shown in FIG. 12C, the second transparent film 217d may be disposed on the first transparent film 217c on which the partition wall 217b is formed. When the second transparent film 217d is disposed, predetermined heat and pressure may be applied, so that the second transparent film 217d can be fixed to the partition wall. The first transparent film 217c and the second transparent film 217d may each include polyethylene terephthalate (PET).

Figure 13:
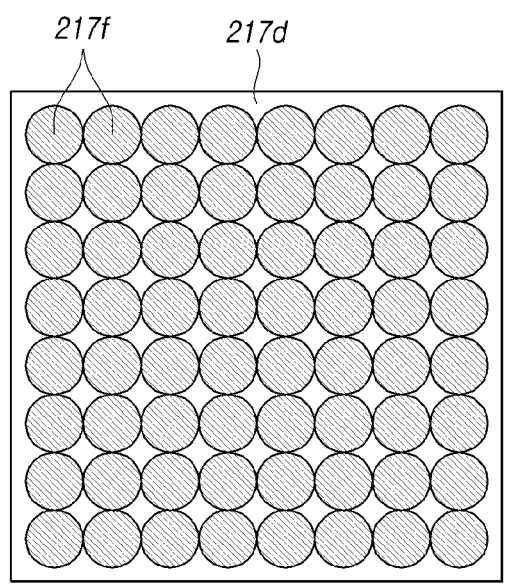
FIG. 13 is a plan view showing the phosphor film according to aspects of the present disclosure.
Figure 14:
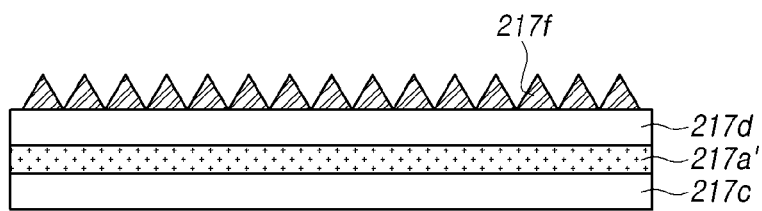
FIG. 14 is a cross-sectional view showing the phosphor film shown in FIG. 13.

FIG. 13 is a plan view showing the phosphor film according to aspects of the present disclosure, and FIG. 14 is a cross-sectional view showing the phosphor film shown in FIG. 13.

Referring to FIGS. 13 and 14, the phosphor film may include the first transparent film 217c and the second transparent film 217d. In addition, the phosphor 217a' may be disposed between the first transparent film 217c and the second transparent film 217d. In addition, the second transparent film 217d may include a conical-shaped structure 217f on the top. The boundary between the second transparent film 217d and a material (for example, an optical sheet) disposed thereon may have a specific slope by the conical-shaped structure, and thus the emission angle of light passing through the second transparent film 217d may change. Accordingly, the light may be scattered by the conical-shaped structure 217f, and the distance through which the yellow light pass may be shortened.

Figure 15:
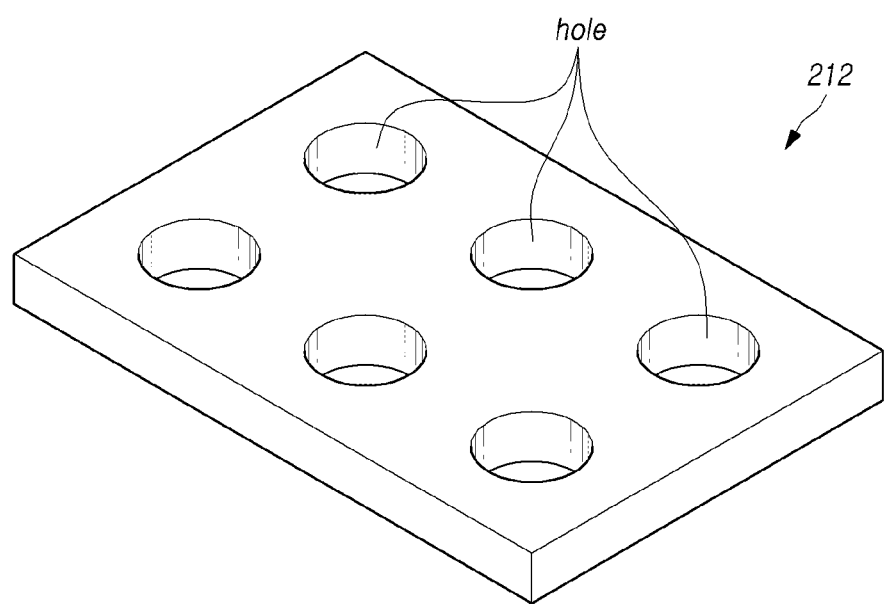
FIG. 15 is a perspective view illustrating a reflector included in the backlight unit according to aspects of the present disclosure.

FIG. 15 is a perspective view illustrating a reflector included in the backlight unit according to aspects of the present disclosure.

Referring to FIG. 15, the reflector 212 may be disposed corresponding to the substrate 210. The reflector 212 may include a plurality of holes. The reflector 212 may be disposed on the substrate 210 so that the light emitting element 211 is disposed in the center of the hole. Here, the shape of the hole is shown as circular, but the shape of the hole is not limited thereto.

FIGS. 16A to 16E are cross-sectional views illustrating processes of manufacturing the backlight unit shown in FIG. 2.

Figure 16A:
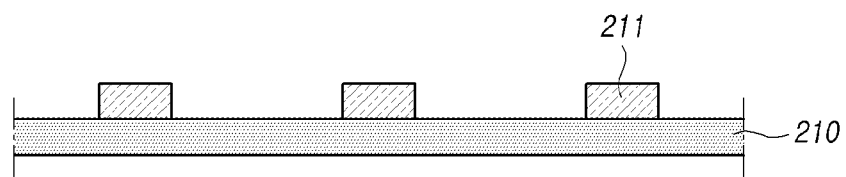
FIGS. 16A to 16E are cross-sectional views illustrating processes of manufacturing the backlight unit shown in FIG. 2.

Referring to FIG. 16A, a plurality of light emitting elements 211 may be disposed on the substrate 210. A reflective film coated on the substrate 210 may be disposed. The coated reflective film may be a white pigment. That is, the white pigment may be coated on the substrate 210.

Figure 16B:
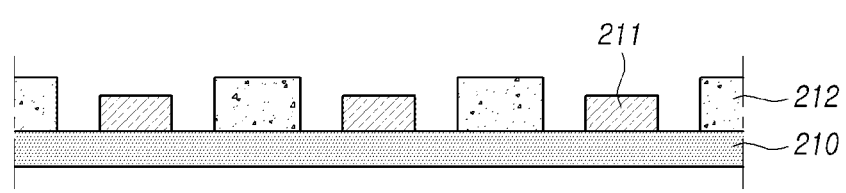

Referring to FIG. 16B, the reflector 212 may be disposed on at least some of the regions except the region in which the light emitting element 211 is disposed on the substrate 210.

The reflector 212 may be formed as the structure in which an area corresponding to the light emitting element 211 is opened and may be disposed on the substrate 210. In addition, the reflector 212 may reflect light emitted from the light emitting element 211 to the front surface of the backlight unit 200 to increase the light efficiency of the backlight unit 200.

Here, in the case that the light emitting element 211 is disposed in the form of a chip, since the size of the light emitting element 211 is small, the height of the reflector 212 may be greater than the height of the light emitting element 211.

Accordingly, light emitted in the lateral direction of the light emitting element 211 may be reflected from the side of the reflector 212 and may be emitted to the front surface of the backlight unit 200, thereby the light efficiency of the backlight unit 200 can further increase.

Figure 16C:
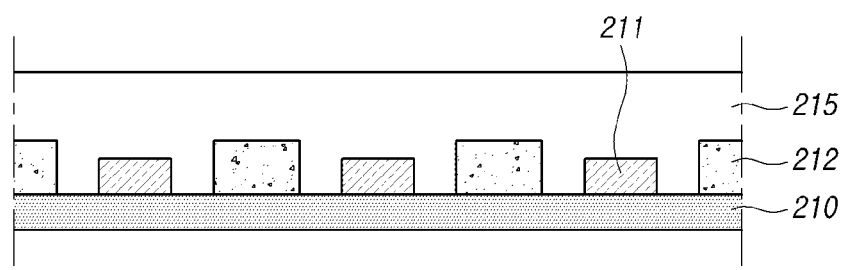

Referring to FIG. 16C, the light source protection layer 215 may be disposed on the plurality of light emitting elements 211 and the reflector 212. The light source protection layer 215 may include, for example, resin. The light source protection layer 215 may be formed on substrate 210 by disposing the partition wall in a region outside the region in which the plurality of light emitting elements 211 are disposed in the outer side of the substrate 210 or on the substrate 210, and by coating the resin inside of the partition wall. The light source protection layer 215 may serve to protect a plurality of light emitting elements 211 disposed on the substrate 210, and may diffuse light emitted from the light emitting elements 211 to provide the function of the light guide plate. Light emitted from the light emitting element 211 may spread as evenly as possible to the top surface of the light source protection layer 215 by the light source protection layer 215. At this time, even though the direction in which light spreads by the light source protection layer 215 is adjusted by the reflector 212, the intensity of light emitted in the vertical direction of the light emitting element 211 may be relatively large, and accordingly, the luminance uniformity of the backlight unit 200 may be reduced.

In the aspects of the present disclosure, the light conversion pattern 216p having optical characteristics is disposed on the light source protection layer 215 at a position corresponding to the light emitting element 211, thereby improving the brightness uniformity while reducing the thickness of the backlight unit 200.

Figure 16D:
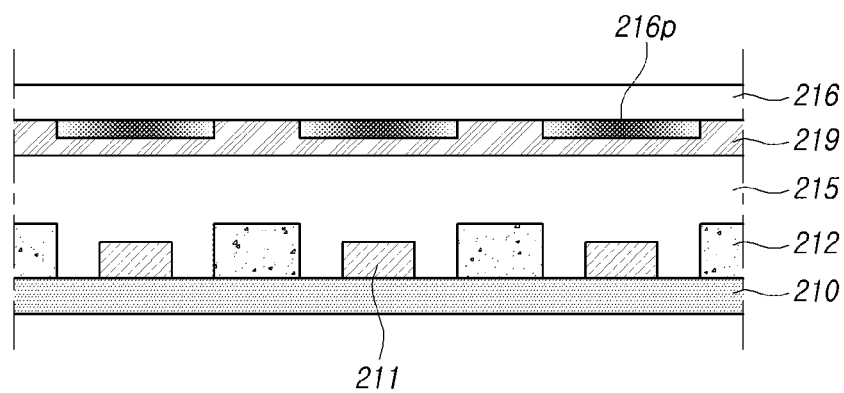

Referring to FIG. 16D, the light conversion sheet 216 may be disposed on the light source protection layer 215, and a plurality of light conversion patterns 216p may be disposed on the lower surface of the light conversion sheet 216. However, the present disclosure is not limited thereto, and the plurality of light conversion patterns 216p may be disposed on the upper surface of the light conversion sheet 216. Further, the light conversion sheet 216 may be adhered to the light source protection layer 215 through the adhesive film 219. The adhesive film 219 may be an optical clear adhesive (OCA) film. In addition, the light conversion sheet 216 may be formed of, for example, PET, but is not limited thereto.

Each of the plurality of light conversion patterns 216p disposed on the lower surface or the upper surface of the light conversion sheet 216 may be disposed to correspond to each of the plurality of light emitting elements 211 disposed on the substrate 210. For example, the light conversion pattern 216p may be disposed such that at least a portion overlaps with the light emitting element 211. That is, in consideration of the diffusion characteristics of light, the light conversion pattern 216p may be arranged to overlap the region including the region where the light emitting element 211 is disposed. The light conversion pattern 216p may scatter, reflect, diffract, or transmit light emitted from the light emitting element 211. For example, the light conversion pattern 216p may scatter light emitted from the light emitting element 211 so that light is emitted. Further, the light conversion pattern 216p may reflect light emitted in the vertical direction from the light emitting element 211 and be reflected back by the reflector 212 so that light is emitted to the region between the light emitting element 211.

In this way, the light emitted from the light emitting element 211 may be scattered, reflected, diffracted or transmitted by the light conversion pattern 216p, so that the luminance uniformity of the backlight unit 200 can be improved.

Figure 16E:
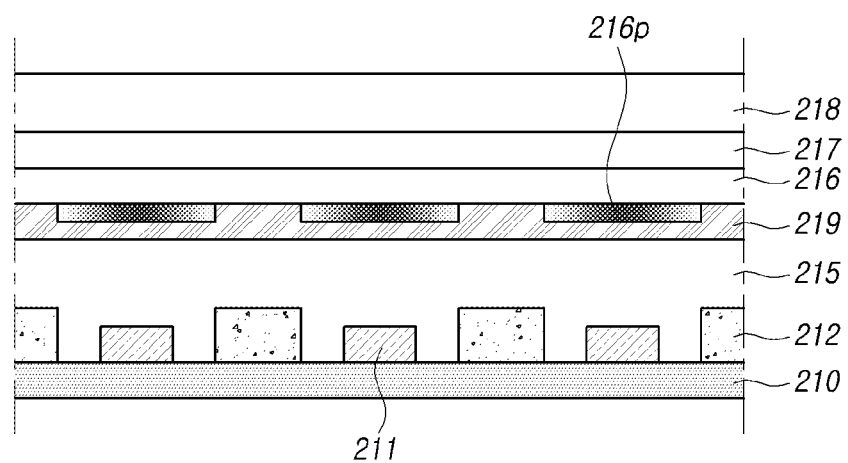

Referring to FIG. 16E, the phosphor film 217 may be disposed on the light conversion sheet 216. Also, one or more optical sheets 218 may be disposed on the phosphor film 217. The phosphor film 217 may include the partition wall.

The phosphor film 217 may include a phosphor having a specific color, and excite the incident light to emit light in a specific wavelength band. Therefore, the light passing through the phosphor film 217 may have a specific color included in the phosphor film 217 or a color mixed with a specific color. For example, if the light emitting element 211 emits light in the first wavelength band (eg, blue light), the phosphor film 217 may emit light in the second wavelength band (eg, green light) and light in the third wavelength band (eg, red light) in response to incident light. Accordingly, in the case that the light emitting element 211 emits blue light, when light emitted from the light emitting element 211 passes through the phosphor film 217, it may be converted into white light and emitted.

Accordingly, in the case that the light emitting element 211 emits blue light, when the blue light passes through the phosphor film 217, the light excited and emitted from the phosphor of the phosphor film 217 and the blue light may be mixed, and the backlight unit 200 may emit the converted white light.

As described above, aspects of the present disclosure include the light conversion sheet 216 including the light conversion pattern 216p disposed at a position corresponding to the light emitting element 211, and various optical elements, thereby improving the image quality represented by the backlight unit 200 while reducing the thickness of the backlight unit 200.

Hereinafter, aspects of the present disclosure will be described together with specific examples of the light conversion pattern 216p disposed on the light conversion sheet 216.

Figure 17:
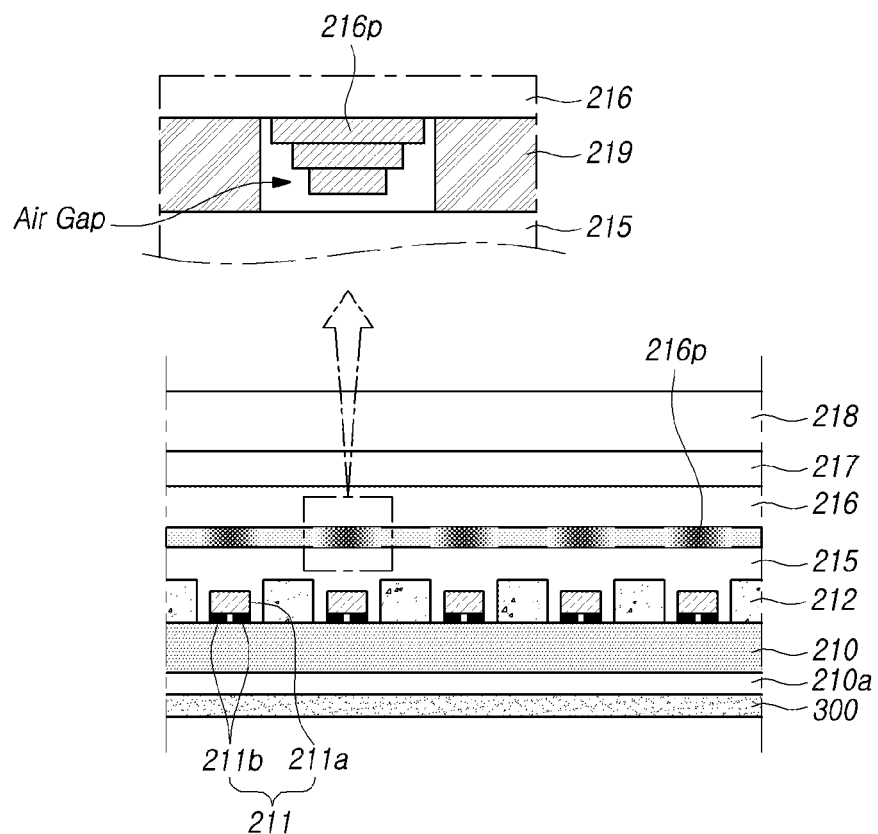
FIG. 17 is a diagram illustrating a first aspect of the structure of the backlight unit according to aspects of the present disclosure.

FIG. 17 is a diagram illustrating a first aspect of the structure of the backlight unit according to aspects of the present disclosure.

Referring to FIG. 17, the substrate 210 may be disposed on the cover bottom 300, and the substrate 210 may be adhered to the cover bottom 300 by an adhesive tape 210a disposed between the cover bottom 300 and the substrate 210.

The plurality of light emitting elements 211 may be disposed on the substrate 210, and the reflector 212 may be disposed in at least a part of the regions except for the region in which the light emitting elements 211 are disposed.

The light emitting element 211 may be, for example, the light emitting diode (LED), and may include a light emitting unit 211a including an n-type semiconductor layer, an activation layer, and a p-type semiconductor layer, and an electrode unit 211b. The light source protection layer 215 may be disposed on the plurality of light emitting elements 211 and the reflector 212. The light conversion sheet 216 on which the light conversion pattern 216p is disposed may be disposed on the light source protection layer 215 at a position corresponding to the light emitting element 211. In addition, the phosphor film 217 and the optical sheet 218 may be disposed on the light conversion sheet 216.

The light conversion pattern 216p disposed on the lower surface of the light conversion sheet 216 may be formed by printing a material having light conversion characteristics on the light conversion sheet 216. For example, the light conversion pattern 216p may be formed by printing an ink containing titanium dioxide (TiO2) on the light conversion sheet 216. In addition, the light conversion pattern 216p disposed on the lower surface of the light conversion sheet 216 may be arranged in one layer or may be arranged in a multi-layer structure. That is, as shown in FIG. 17, the light conversion pattern 216p disposed on the lower surface of the light conversion sheet 216 may be composed of three layers. The light conversion pattern 216p may be formed through a method of printing the light conversion material on the light conversion sheet 216 three times, and the area of the printed light conversion material may be gradually narrowed. In addition, the light conversion pattern 216p may be disposed on the light emitting element 211 by inverting the light conversion sheet 216 on which the light conversion pattern 216p is disposed and placing it on the light source protection layer 215.

Therefore, the area of the light conversion pattern 216p may be gradually narrowed downward from the bottom of the light conversion sheet 216, and the thickness of the central portion of the light conversion pattern 216p may be greater than the thickness of the outer portion.

That is, since the intensity of light emitted in the vertical direction from the light emitting element 211 is the largest, the central portion of the light conversion pattern 216p may be disposed thicker. However, it is not limited thereto.

In this way, by allowing the light conversion pattern 216p to be disposed on the light emitting element 211, at least a portion of the light emitted in the vertical direction from the light emitting element 211 may be blocked, and as a result, hot spots may be prevented from appearing in an area where the light emitting element 211 is disposed. The light conversion sheet 216 on which the light conversion pattern 216*p* is disposed may be adhered to the light source protection layer 215 by an adhesive film 219. At this time, the adhesive film 219 may be disposed on at least some of the areas except the area where the light conversion pattern 216*p* is disposed on the lower surface of the light conversion sheet 216.

Therefore, the adhesive film 219 may not be disposed in the region where the light conversion pattern 216*p* is disposed, and an air gap may exist between the light conversion pattern 216*p* and the light source protection layer 215. In addition, the side portion of the light conversion pattern 216*p* and the adhesive film 219 may be spaced apart from each other. As an air gap exists between the light conversion pattern 216*p* and the light source protection layer 215, light emitted in the lateral direction of the light conversion pattern 216*p* may be reflected by the air gap. That is, light emitted in the lateral direction of the light conversion pattern 216*p* may be emitted at a large refractive angle by the air layer having a low refractive index or may be reflected from the air layer. In addition, light reflected from the air layer is reflected and emitted again by the reflector 212, thereby increasing light efficiency while assisting the light conversion function of the light conversion pattern 216*p*.

As described above, it is possible to increase the light efficiency of the backlight unit while preventing hot spots by using the structure in which the light conversion pattern 216*p* and the air gaps are disposed at positions corresponding to the light emitting elements 211. Further, the light conversion pattern 216*p* disposed under the light conversion sheet 216 may be arranged in a different structure according to the position.

Figure 18A:
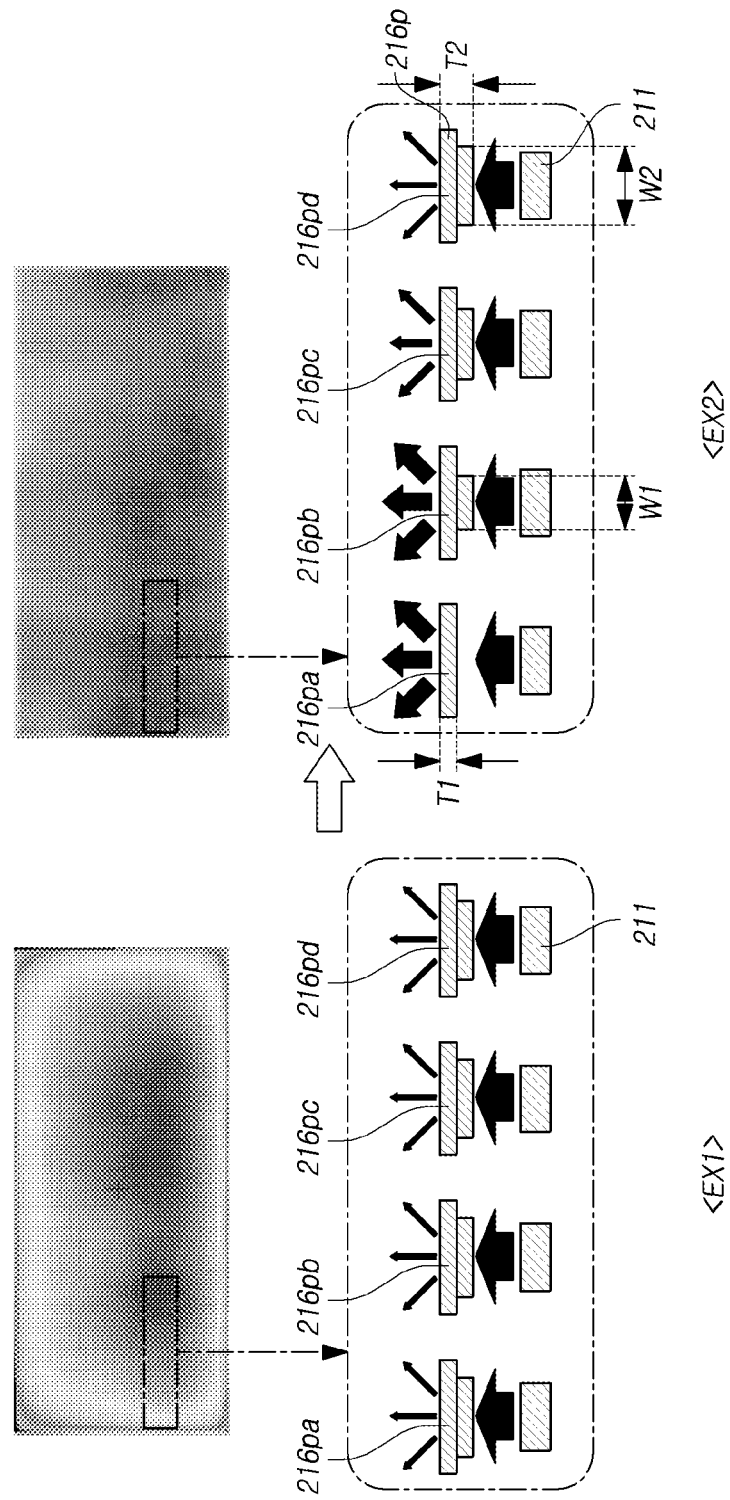
FIGS. 18A and 18B are views illustrating examples of the structure according to the position of the light conversion pattern included in the backlight unit shown in FIG. 17.
Figure 18B:
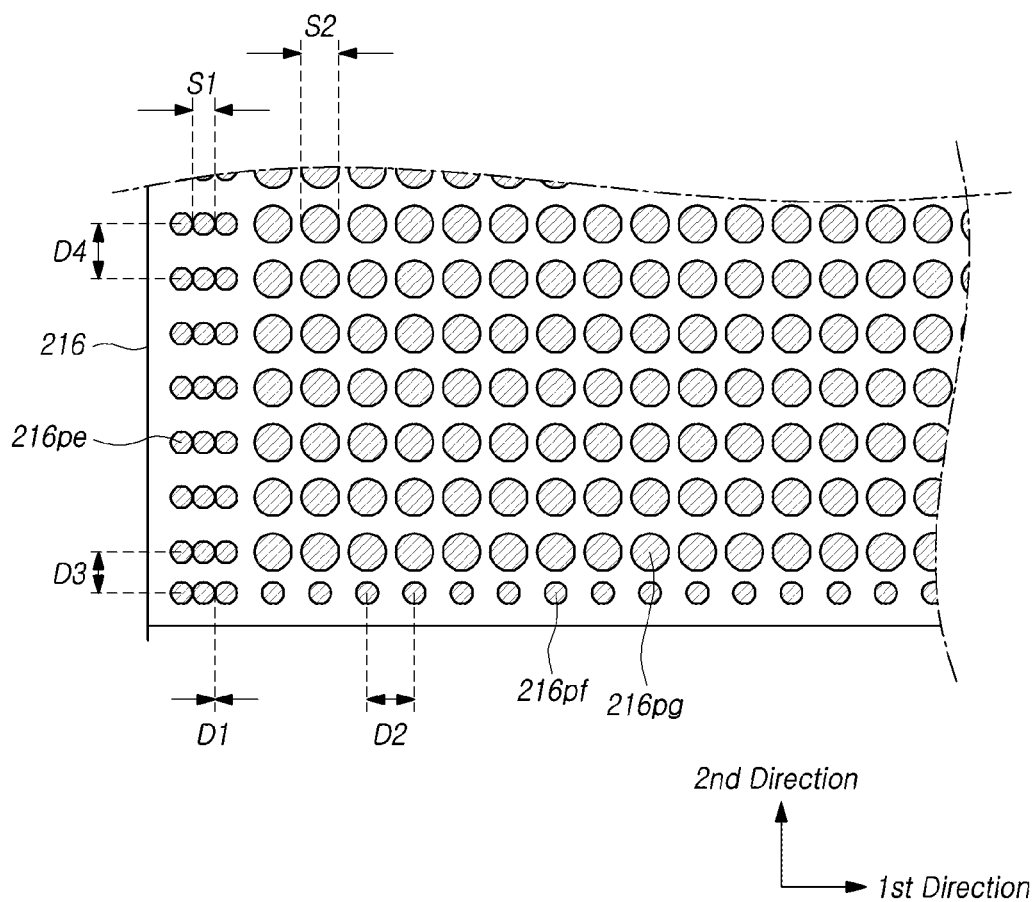

FIGS. 18A and 18B are views illustrating examples of the structure according to the position of the light conversion pattern included in the backlight unit shown in FIG. 17.

FIG. 18A illustrates an example of the brightness of the backlight unit 200 according to the structure of the light conversion pattern 216*p*, and <EX1> is an example of the brightness measured when the light conversion pattern 216*p* is arranged in a constant structure and <EX2> represents an example of the brightness measured when the light conversion pattern 216*p* is arranged in a different structure according to the position.

As shown in <EX1> of FIG. 18A, in the case that the structure of the light conversion pattern 216*pa* disposed in the outer region of the backlight unit 200 and the light conversion pattern 216*pd* disposed in the central region are the same, the luminance or brightness of the outer region of the backlight unit may appear lower than the central region.

That is, since the number of light emitting elements 211 for supplying light to the corresponding area is relatively small in the outer area of the backlight unit 200, when the light conversion pattern 216*p* having the same level of light conversion characteristics is disposed, the luminance may be lowered compared to the central region of the backlight unit.

Therefore, as shown in <EX2> in FIG. 18A, the structure of the light conversion pattern 216*pa* disposed in the outer region of the backlight unit 200 and the light conversion pattern 216*pd* disposed in the central region may be arranged to be different from each other, thereby preventing the decrease in luminance in the outer region of the backlight unit 200 and improving the uniformity of the overall luminance.

For example, the light conversion pattern 216*p* may be disposed so that the thickness T1 of the light conversion pattern 216*pa* disposed in the outer region of the backlight unit 200 is smaller than the thickness T2 of the light conversion pattern 216*pd* disposed in the central region.

Alternatively, the light conversion pattern 216*p* may be disposed so that the area W1 of the thickest part in the light conversion pattern 216*pb* disposed adjacent to the outer region of the backlight unit 200 is smaller than the area W2 of the thickest part of the light conversion pattern 216*pd* arranged in the central area. That is, in the light conversion patterns 216*pa* and 216*pb* disposed in the outer region or the region adjacent to the outer region of the backlight unit 200, the area of the portion having a high blocking characteristic may be small.

Alternatively, the light conversion pattern 216*p* may be disposed so that the thickness of the light conversion pattern 216*p* gradually decreases from the center area to the outer area of the backlight unit 200, or the area of the thickest portion in the light conversion pattern 216*p* gradually decreases. That is, the area of the portion having high blocking characteristics in the light conversion patterns 216*pa* and 216*pb* disposed in the outer region or the region adjacent to the outer region of the backlight unit 200 may be made smaller.

In addition, in some cases, by using a manner in which the number of light emitting elements 211 or the distance between the light emitting elements 211 is different, the structure of the light conversion pattern 216*p* may be arranged differently in the central region and the outer region of the backlight unit 200.

FIG. 18B shows another example of a structure in which the light conversion pattern 216*p* is disposed on the lower surface of the light conversion sheet 216.

Here, the distance between the light emitting elements 211 disposed in the outer region of the backlight unit 200 may be smaller than the distance between the light emitting elements 211 disposed in the central region of the backlight unit 200. That is, the light emitting element 211 may be disposed in a more dense structure in the outer region of the backlight unit 200 so that the luminance of the central region and the outer region of the backlight unit 200 may be more uniform.

In addition, since the light conversion pattern 216*p* disposed on the lower surface of the light conversion sheet 216 is disposed to correspond to the light emitting element 211, the distance between the light conversion pattern 216*p* disposed in the outer region of the backlight unit 200 may be different from the distance between the light conversion patterns 216*p* disposed in the central region.

For example, the distance D1 in the first direction of the light conversion pattern 216*p* disposed in the outer area of the backlight unit 200 may be smaller than the distance D2 in the first direction of the light conversion pattern 216*p* disposed in the central area. In addition, the distance D3 in the second direction of the light conversion pattern 216*p* disposed in the outer region of the backlight unit 200 may be smaller than the distance D4 in the second direction of the light conversion pattern 216*p* disposed in the central area.

At this case, the size, thickness, etc. of the light conversion pattern 216*p* disposed in the outer region of the backlight unit 200 can be different from the size, thickness, etc. of the light conversion pattern 216*p* disposed in the central region of the backlight unit 200.

For example, as illustrated in FIG. 18B, the size S1 of the light conversion patterns 216*pe* and 216*pf* disposed in the outer region of the backlight unit 200 may be smaller than the size S2 of the light conversion pattern 216*pg* disposed in the central region of the backlight unit 200.

Alternatively, the light conversion pattern 216p may have a multi-layer structure as described above. In this case, the thickness or the area of the portion having the greatest thickness of the light conversion patterns 216pe and 216pf disposed in the outer area of the backlight unit 200 may be smaller than the thickness or the area of the portion having the greatest thickness of the light conversion pattern 216pg disposed in the central area of the backlight unit 200.

That is, by reducing the size of the light conversion patterns 216pe and 216pf disposed in the outer region of the backlight unit 200, the light conversion pattern can be arranged to correspond to the light emitting element 211 arranged at a narrow interval. Therefore, it is possible to prevent a hot spot from being generated at a position corresponding to the light emitting element 211 in the outer region of the backlight unit 200.

In addition, by lowering the level at which light emitted from the light emitting element 211 is blocked in the outer region of the backlight unit 200, the amount of emitted light may be increased and the luminance in the outer region of the backlight unit 200 may be prevented from deteriorating, thereby ensuring the luminance uniformity in the entire area of the backlight unit 200.

As described above, by differently arranging the structure of the light conversion pattern 216p according to region of the backlight unit 200, it is possible to prevent luminance from being lowered in the outer region of the backlight unit 200 and improve luminance uniformity.

Furthermore, the hot spot of the backlight unit 200 may be prevented and the luminance uniformity may be improved by using the arrangement structure of the light conversion pattern 216p as described above.

In addition, according to the aspects of the present disclosure, it is possible to provide a method for improving the image quality of the backlight unit 200 and improving light efficiency by diffracting the light emitted in the vertical direction of the light emitting element 211.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the aspects disclosed in the present disclosure are intended to illustrate the scope of the technical idea of the present disclosure, and the scope of the present disclosure is not limited by the aspect. The scope of the present disclosure shall be construed on the basis of the accompanying claims in such a manner that all of the technical ideas included within the scope equivalent to the claims belong to the present disclosure.

What is claimed is:

1. A backlight unit comprising:
    a light emitting unit including a plurality of light emitting elements;
    a light conversion sheet having a plurality of light conversion patterns disposed at positions corresponding to the plurality of light emitting elements; and
    a phosphor film disposed on the light conversion sheet and including a plurality of partition walls dividing a light emitting surface into a plurality of sub-blocks, each sub-block formed between two adjacent partition walls, and the phosphor film disposed in the plurality of sub-blocks,
    wherein the plurality of light conversion patterns are separate apart from one another,
    wherein the phosphor film includes a first transparent film and a second transparent film respectively disposed on upper and lower portions of the plurality of partition walls,
    wherein the plurality of partition walls have tapered shapes and include slopes,
    wherein one ends of the slopes included in the two adjacent partition walls are in contact with each other at a point, and
    wherein other ends of the slopes included in the two adjacent partition walls are in contact with one of the first transparent film and the second transparent film.

2. The backlight unit of claim 1, wherein the partition wall includes a transparent resin.

3. The backlight unit of claim 2, further comprising an optical filter disposed between the first transparent film and the transparent resin or between the second transparent film and the transparent resin.

4. The backlight unit of claim 1, wherein the light emitting unit further includes a reflector disposed around the plurality of light emitting elements.

5. The backlight unit of claim 1, further comprising an optical sheet disposed on the phosphor film.

6. The backlight unit of claim 5, wherein the plurality of partition walls have a maximum thickness the same as a thickness of the optical sheet.

7. The backlight unit of claim 1, wherein the plurality of light conversion patterns adjusts an emission direction of light emitted from the light emitting element.

8. The backlight unit of claim 1, wherein the plurality of light conversion patterns have a greatest thickness at a center portion.

9. A display device comprising:
    a display panel; and
    a backlight unit disposed under the display panel and emitting light to the display panel,
    wherein the backlight unit includes a light emitting unit having a plurality of light emitting elements, a light conversion sheet having a plurality of light conversion patterns disposed at positions corresponding to the plurality of light emitting elements, and a phosphor film disposed on the light conversion sheet and including a plurality of partition walls dividing a light emitting surface into a plurality of sub-blocks, each sub-block formed between two adjacent partition walls, and the phosphor film disposed in the plurality of sub-blocks, wherein the plurality of light conversion patterns are separate apart from one another,
    wherein the phosphor film includes a first transparent film and a second transparent film respectively disposed on upper and lower portions of the plurality of partition walls,
    wherein the plurality of partition walls have tapered shapes and include slopes,
    wherein one ends of the slopes included in the two adjacent partition walls are in contact with each other at a point, and
    wherein other ends of the slopes included in the two adjacent partition walls are in contact with one of the first transparent film and the second transparent film region.

10. The display device of claim 9, wherein the plurality of partition walls include a transparent resin.

11. The display device of claim 10, further comprising an optical filter disposed between the first transparent film and the transparent resin or between the second transparent film and the transparent resin.

12. The display device of claim 9, wherein the light emitting unit further includes a reflector disposed around the plurality of light emitting elements.

13. The display device of claim 9, further comprising an optical sheet disposed on the phosphor film.

14. The display device of claim 13, wherein the plurality of partition walls have a maximum thickness the same as a thickness of the optical sheet.

15. The display device of claim 9, wherein the plurality of light conversion patterns adjusts an emission direction of light emitted from the light emitting element.

16. The display device of claim 9, wherein the plurality of light conversion patterns have a greatest thickness at a center portion.

* * * * *